US012664249B2

(12) United States Patent
Remer et al.

(10) Patent No.: US 12,664,249 B2
(45) Date of Patent: Jun. 23, 2026

(54) CENTRALIZED LEDGER SYSTEM FOR DEVICE AUTHENTICATION

(71) Applicant: ST. JUDE MEDICAL, CARDIOLOGY DIVISION, INC., St. Paul, MN (US)

(72) Inventors: Isaac Remer, Richfield, MN (US); Timothy S. Marass, Minneapolis, MN (US); Derek Sutermeister, Ham Lake, MN (US); Hai Huang, Woodbury, MN (US)

(73) Assignee: ST. JUDE MEDICAL, CARDIOLOGY DIVISION, INC., St. Paul, MN (US)

( * ) Notice: Subject to any disclaimer, the term of this patent is extended or adjusted under 35 U.S.C. 154(b) by 374 days.

(21) Appl. No.: 18/035,834

(22) PCT Filed: Nov. 10, 2021

(86) PCT No.: PCT/US2021/058696
§ 371 (c)(1),
(2) Date: May 8, 2023

(87) PCT Pub. No.: WO2022/103782
PCT Pub. Date: May 19, 2022

(65) Prior Publication Data
US 2025/0077639 A1 Mar. 6, 2025

Related U.S. Application Data

(60) Provisional application No. 63/112,092, filed on Nov. 10, 2020.

(51) Int. Cl.
*G06F 21/44* (2013.01)
*H04L 9/32* (2006.01)

(52) U.S. Cl.
CPC ............ *G06F 21/44* (2013.01); *H04L 9/3236* (2013.01)

(58) Field of Classification Search
CPC .......... G06F 21/00; G06F 21/44; G06F 21/45; G06F 21/57; G06F 21/70; G06F 21/71;
(Continued)

(56) References Cited

U.S. PATENT DOCUMENTS 4,038,743 A 8/1977 Durocher et al.
5,037,329 A 8/1991 Wright
(Continued)

FOREIGN PATENT DOCUMENTS

CN 213520365 U 6/2021
EP 2134122 A1 12/2009

OTHER PUBLICATIONS

"Extended European Search Report received in European application No. EP22186619.7 mailed on Apr. 13, 2023", 12 Pages.
(Continued)

*Primary Examiner* — Daniel B Potratz
(74) *Attorney, Agent, or Firm* — Billion & Armitage

(57) ABSTRACT

A method of authenticating devices utilizes a central ledger distributed to a plurality of local systems includes storing a unique identifier locally on each device, modifying a central ledger to include an entry associated with the unique identifier and communicating the central ledger to a plurality of local systems for storage. To authorize a device, the local system receives a unique identifier from a connected device and searches the local ledger to verify/authenticate the validity of the connected device for use in the local system. The local system may then modify an entry in the local ledger associated with the unique identifier to reflect use and communicate the modified local ledger from each of the plurality of local systems to the centralized system. The
(Continued)

central system then modifies the central ledger based on the received local ledger and communicates the modified central ledger to a local system.

14 Claims, 10 Drawing Sheets

(58) Field of Classification Search
CPC ....... G06F 21/73; H04W 12/06; H04W 12/30; H04W 12/40
See application file for complete search history.

(56) References Cited

U.S. PATENT DOCUMENTS

| | | | | |
|---|---|---|---|---|
| 8,266,676 | B2 * | 9/2012 | Hardjono | ............ H04L 63/1433 |
| | | | | 713/181 |
| 9,099,797 | B1 | 8/2015 | Duesterhoeft et al. | |
| 11,711,692 | B2 * | 7/2023 | Marquardt | ........ H04W 12/0431 |
| | | | | 713/156 |
| 12,425,391 | B2 * | 9/2025 | Ramezanpour | ....... H04L 9/3273 |
| 2004/0137790 | A1 | 7/2004 | Lee et al. | |
| 2011/0087882 | A1 * | 4/2011 | Kuo | .................... H04L 63/0823 |
| | | | | 713/156 |
| 2012/0129383 | A1 | 5/2012 | Swearingen | |
| 2015/0332809 | A1 | 11/2015 | Natoli et al. | |
| 2016/0323106 | A1 * | 11/2016 | Roper | ..................... G06F 21/57 |
| 2018/0026408 | A1 | 1/2018 | Ensley et al. | |
| 2019/0036957 | A1 * | 1/2019 | Smith | ................... H04L 9/3239 |
| 2020/0127965 | A1 * | 4/2020 | Oron | .................... H04L 61/4511 |
| 2020/0257778 | A1 | 8/2020 | Pham | |
| 2020/0295477 | A1 | 9/2020 | Gruber | |
| 2021/0398112 | A1 * | 12/2021 | Ward | ................... G06Q 20/065 |
| 2022/0352652 | A1 | 11/2022 | Yudate | |
| 2023/0308418 | A1 * | 9/2023 | Nukushina | .............. H04L 63/10 |

OTHER PUBLICATIONS

"International Search Report and Written Opinion Received mailed Feb. 11, 2022", 26 pages.
"Communication Pursuant to Article 94(3) EPC Mailed on Dec. 4, 2023", 4 pages.
"International Preliminary Report on Patentability Received mailed on May 25, 2023", 9 Pages.

* cited by examiner

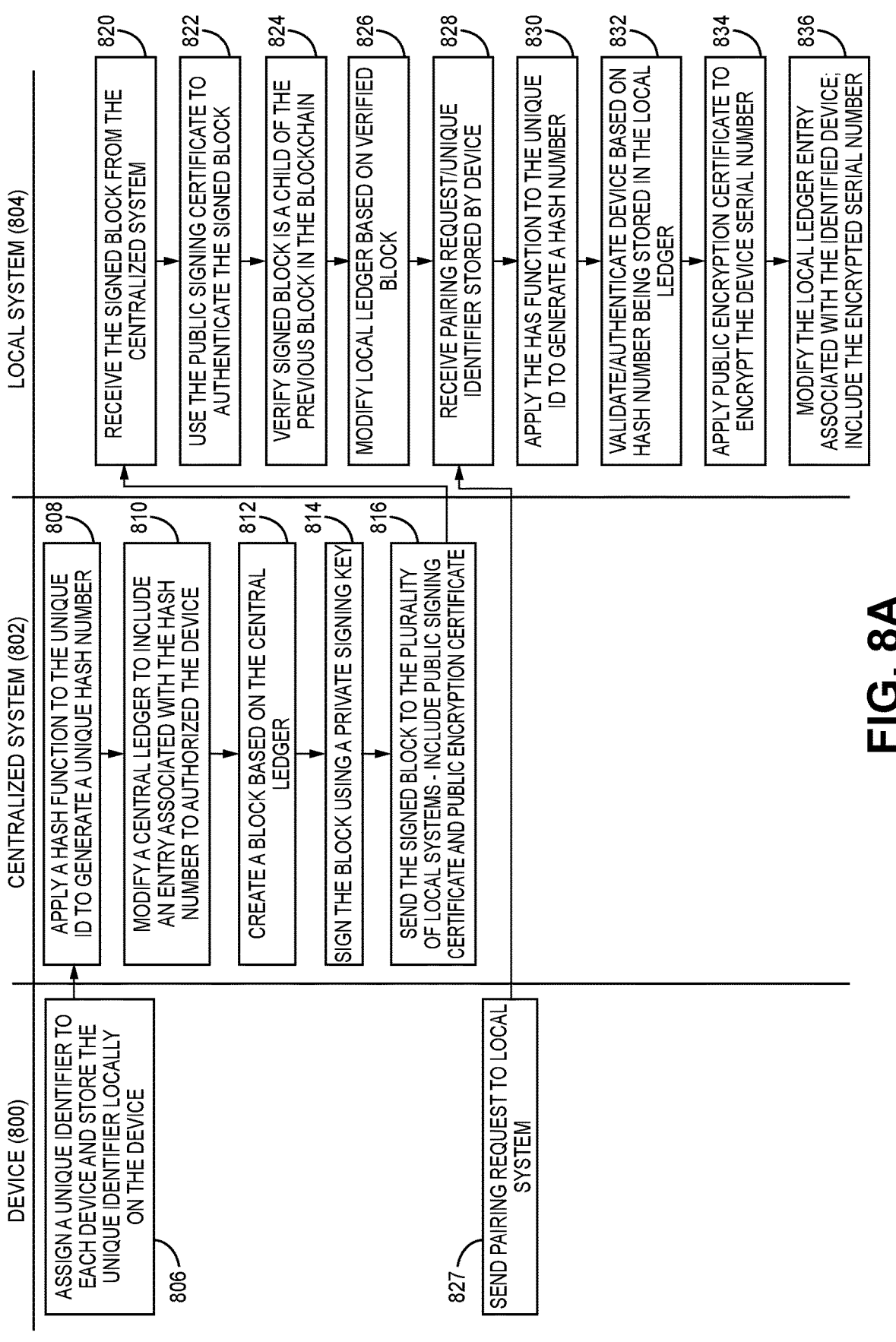

DEVICE (800)

806 — ASSIGN A UNIQUE IDENTIFIER TO EACH DEVICE AND STORE THE UNIQUE IDENTIFIER LOCALLY ON THE DEVICE

827 — SEND PAIRING REQUEST TO LOCAL SYSTEM

CENTRALIZED SYSTEM (802)

808 — APPLY A HASH FUNCTION TO THE UNIQUE ID TO GENERATE A UNIQUE HASH NUMBER

810 — MODIFY A CENTRAL LEDGER TO INCLUDE AN ENTRY ASSOCIATED WITH THE HASH NUMBER TO AUTHORIZED THE DEVICE

812 — CREATE A BLOCK BASED ON THE CENTRAL LEDGER

814 — SIGN THE BLOCK USING A PRIVATE SIGNING KEY

816 — SEND THE SIGNED BLOCK TO THE PLURALITY OF LOCAL SYSTEMS - INCLUDE PUBLIC SIGNING CERTIFICATE AND PUBLIC ENCRYPTION CERTIFICATE

LOCAL SYSTEM (804)

820 — RECEIVE THE SIGNED BLOCK FROM THE CENTRALIZED SYSTEM

822 — USE THE PUBLIC SIGNING CERTIFICATE TO AUTHENTICATE THE SIGNED BLOCK

824 — VERIFY SIGNED BLOCK IS A CHILD OF THE PREVIOUS BLOCK IN THE BLOCKCHAIN

826 — MODIFY LOCAL LEDGER BASED ON VERIFIED BLOCK

828 — RECEIVE PAIRING REQUEST/UNIQUE IDENTIFIER STORED BY DEVICE

830 — APPLY THE HAS FUNCTION TO THE UNIQUE ID TO GENERATE A HASH NUMBER

832 — VALIDATE/AUTHENTICATE DEVICE BASED ON HASH NUMBER BEING STORED IN THE LOCAL LEDGER

834 — APPLY PUBLIC ENCRYPTION CERTIFICATE TO ENCRYPT THE DEVICE SERIAL NUMBER

836 — MODIFY THE LOCAL LEDGER ENTRY ASSOCIATED WITH THE IDENTIFIED DEVICE; INCLUDE THE ENCRYPTED SERIAL NUMBER

FIG. 8A

CENTRALIZED LEDGER SYSTEM FOR DEVICE AUTHENTICATION

CROSS-REFERENCE TO RELATED APPLICATIONS

This application claims benefit of and priority to U.S. Provisional Application No. 63/112,092, titled "CENTRAL-IZED LEDGER SYSTEM FOR DEVICE AUTHENTICA-TION", filed Nov. 10, 2020, the contents of which are incorporated by reference herein.

BACKGROUND

The present invention relates generally to medical devices and in particular to verifying/authenticating medical devices for use.

In some instances, medical devices are intended as single-use devices, for a limited number of uses, or for use beyond a certain period of time. To track such usage, some medical devices include an on-board memory such as an EEPROM that, when connected to a system controller, can be used to track when the device is first used and, in some circum-stances, prevent the continued usage of the device beyond a prescribed period of time. Although some safeguards may be provided regarding the appropriate number of uses such as the use of an on-board memory, the manufacturer has a limited ability to prevent unauthorized use or reprocessing of its devices. It would therefore be beneficial to develop a system that requires authentication of a medical device prior to use and that could be utilized to prevent the unauthorized use or reprocessing of devices.

SUMMARY

According to one aspect, a method of authenticating devices utilizes a central ledger distributed to a plurality of local systems. The method includes storing a unique iden-tifier locally on each device. The method further includes modifying a central ledger located on a centralized system to include an entry associated with the unique identifier stored locally on the device and communicating the central ledger to a plurality of local systems, wherein each of the local systems stores the central ledger as a local ledger. To authorize a device for use, the local system receives a unique identifier from a connected device, and searches the local ledger to verify/authentic the validity of the connected device for use in the local system. Based on the use of the device, the local system modifies an entry in the local ledger associated with the unique identifier and then communicates the modified local ledger from each of the plurality of local systems to the centralized system. The central system then modifies the central ledger based on the received local ledger and communicates the modified central ledger to a local system.

According to another aspect, a centralized ledger system for device authentication includes a centralized system and a local system. The centralized system is configured to maintain a central ledger comprised of a plurality of entries, wherein the central ledger is modified to include an entry associated with an unique identifier stored locally on a medical device. The local system is configured to receive the central ledger from the centralized system and to store the central ledger as a local ledger. The local system receives a unique identifier from a medical device configured to be used with the local system and utilizes the local ledger to authenticate use of the medical device. Having used the medical device, the local system modifies an entry in the local ledger corresponding with the unique identifier of the medical device connected to the local system and commu-nicates the modified local ledger back to the centralized system for updating of the central ledger based on the modified local ledger.

According to another aspect, a method of reprocessing a medical device for reuse includes utilizing a medical device identified by a unique identifier in conjunction with a local system, wherein the local system modifies a local ledger to include use information associated with the medical device. The method further includes applying a hash function to the use information associated with the device to generate a first hash of the use information and communicating the medical device to be reprocessed, the modified local ledger, the unique identifier associated with the medical device, and the hash of the use information to a reprocessing center. At the reprocessing center, the unique identifier is retrieved from the medical device to be reprocessed. The unique identifier is utilized to retrieve use information from the modified local ledger. The method further includes applying the hash function to the retrieved use information to generate a second hash of the use information and then comparing the first hash to the second hash to verify the medical device for reprocessing. If verified, a new unique identifier for the medical device is generated based on the unique identifier of the device and one of the first hash or the second hash. The central ledger is then modified to include an entry corre-sponding to the new unique identifier, wherein the new entry authorizes the medical device for reuse.

DESCRIPTION OF THE DRAWINGS

FIGS. 8A-8C are swimlane diagrams illustrating func-tions performed by a device, a centralized system and a local system to authenticate a device according to some embodi-ments.

DETAILED DESCRIPTION

The present disclosure is directed to a centralized ledger system utilized to authenticate use of medical devices. Each device is stamped with or stores a unique identifier. A centralized system is configured to store a central ledger that includes a list of devices authenticated for use. The central ledger is distributed to a plurality of local systems, each of which maintains a local ledger. Pairing a device with a local system requires the unique identifier or serial number (SN) of the device to be compared with the local ledger maintained by the local system. Based on the comparison of the device SN to the local ledger, the device is selectively authenticated for use with the local system. The local ledger is then modified to reflect the use of the device, and the modified local ledger is communicated to the central ledger for updating. To prevent tampering, a number of additional procedures may be utilized to increase the security of the centralized ledger system. In some embodiments, described in greater detail below, blockchain structures are utilized to update the central ledger, wherein prior knowledge of the previous ledger (i.e., block) is required to access the updated ledger (i.e., newest block).

Figure 1:
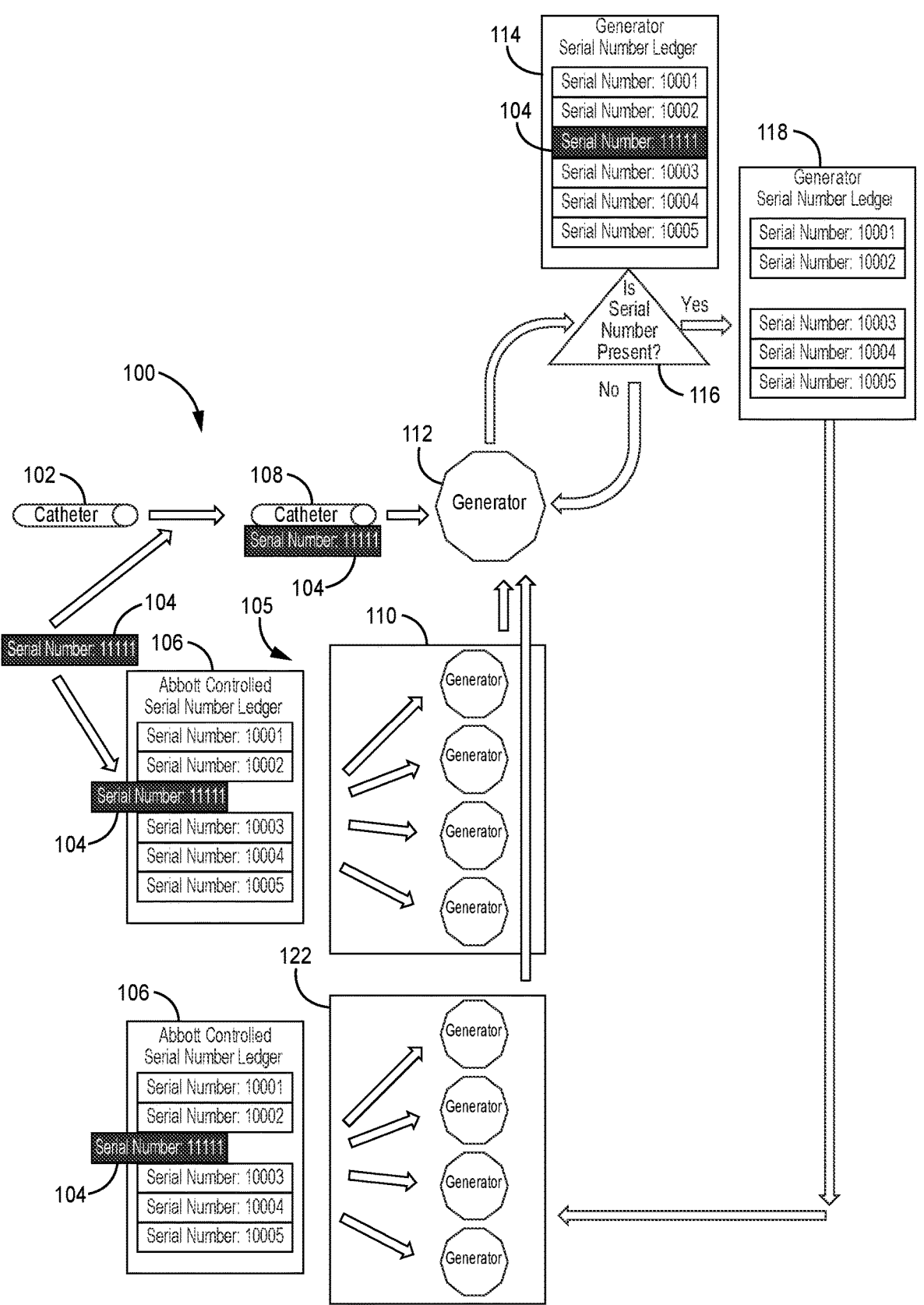
FIG. 1 is a block diagram of a centralized ledger system according to some embodiments.

FIG. 1 is a block diagram of a centralized ledger system 100 according to some embodiments. The block diagram illustrates operations performed by components of the centralized ledger system 100. Components of the centralized ledger system 100 include a medical device 102, a centralized system 105 that maintains a central ledger 106, and a plurality of local systems 112, each of which includes a local ledger 114. The medical device 102 may be a catheter or some other type of medical device. In some embodiments, the medical device 102 may be authorized for a single use or a plurality of uses. The centralized ledger system 100 is utilized to maintain control over the authentication and use of the medical device within a network of local systems 112. In particular, the centralized system 100 prevents an unauthorized third-party from reprocessing or reusing medical devices 100 when such devices are intended as single or limited-use devices.

In the embodiments shown in FIG. 1, the medical device 102 is assigned a unique identifier or serial number (SN) 104. In some embodiments, the unique identifier 104 is stored by the medical device 102. For example, the unique identifier 104 may be stored to non-volatile memory such as EEPROM or flash located on the medical device 102. In addition, the unique identifier 104 is added to the central ledger 106. For example, in some embodiments the central ledger maintains a list of entries, each entry corresponding with a medical device. To be authorized for use, an entry must be provided on the ledger that identifies the device authorized for use. 106 is then distributed at step 110 to the plurality of local systems 112. In some embodiments, the centralized ledger 106 is communicated electronically to each of the plurality of local systems 112. In other embodiments, the centralized ledger 106 may be communicated manually (via physical computer readable storage device) to each of the plurality of local systems 112. The central ledger is received by the local systems and utilized to selectively authenticate devices utilized by the local system 112 as part of a procedure. For example, in the embodiment shown in FIG. 1 the unique identifier 104 is included in the local ledger 114 associated with local system 112. In this embodiment, presence of the unique identifier 104 means that the device corresponding with unique identifier 104 is authorized for use with local system 112.

The medical device 102 is then distributed for use with one of the plurality of local systems 112. Authentication of the medical device 102 for use with the local system 112 requires the local system 112 to retrieve the unique identifier 104 from the medical device 102. At step 116, the local system 112 compares the unique identifier 104 retrieved from the medical device 102 with the list maintained by the local ledger 114. If the unique identifier is not located in the local ledger 114 (or is not identified as authorized for use), then use of the medical device 102 is not authorized and cannot be used. If the unique identifier is located in the local ledger 114 (or is not identified as authorized for use), then the medical device 102 is authorized for use.

Once authorized, the medical device 102 can be utilized with local system 104. Having authorized the medical device 102 for use, the local ledger 114 is updated to reflect the use of the device. In some embodiments, updating the local ledger 114 includes removing the unique identifier 104 associated with medical device 102 from the local ledger 114, as shown at step 118. In other embodiments, updating the local ledger 114 includes modifying the local ledger 114 to reflect the use of the medical device 102. For example, updating the local ledger 114 may include modifying the entry to reflect prior use of medical device 102. This may include modifying the local ledger 114 to include the date and time of first use, the length or duration of the use, the total number of uses, location of use, conditions of use, etc.

To prevent unauthorized reprocessing/use of the medical devices, the information recorded by modifying the local ledger 118 must be distributed to the other local systems. To this end, the centralized system 105 collects the modified local ledger from each of the plurality of local systems 112 and incorporates the changes from each into a modified or updated central ledger 106'. In some embodiments, the modified local ledger 118 is communicated in its entirety to the central system 105. In other embodiments, only the modifications to the modified local ledger 118 are communicated. However, in some embodiments communicating the entire modified local ledger 118 provides additional security because it is harder to spoof or replicate all entries in the modified local ledger 118. Communication of the modified local ledger 118 to the central system 105 may be electronic or manual. Electronic communication may utilize encryption to secure the communication. Manual communication may include copying the modified local ledger 118 onto a computer readable medium for physical transport to the centralized system 105. In some embodiments, the modified local ledger 118 is communicated to the centralized system 105 at regular intervals (e.g., once a day, once a week, etc.), while in other embodiments the modified local ledger 118 is communicated only in response to changes made to the local ledger.

The centralized ledger 106 is then modified to incorporate the changes indicated in the communication received from the local systems (either modified local ledger 118 or list of changes made to the modified local ledger 118). For example, in some embodiments the centralized ledger 106 is compared to the modified local ledger 118, and differences are utilized to modify the centralized ledger 106. For example, in the embodiment shown in FIG. 1, the ledger entry corresponding to unique identifier 104 has been deleted from the modified local ledger 118. In response, the entry corresponding to unique identifier 104 is deleted from the centralized ledger 106—thereby creating a modified centralized ledger 106'. In other embodiments, rather than delete entries the entries may be modified to reflect the use of the medical device 102. Whether entries are deleted or modified, the centralized ledger 106 is modified to incorporate updates indicated by the received modified local ledger 118. At step 122, the modified central ledger 106' is communicated from the centralized system 105 to the plurality of the local systems 112, wherein the local ledger 114 stored by the local system 112 is updated or replaced with the modified centralized ledger 106' and the process repeats. In this way, the centralized ledger system 100 manages the authentication of devices utilized by the plurality of local system 112.

Figure 2:
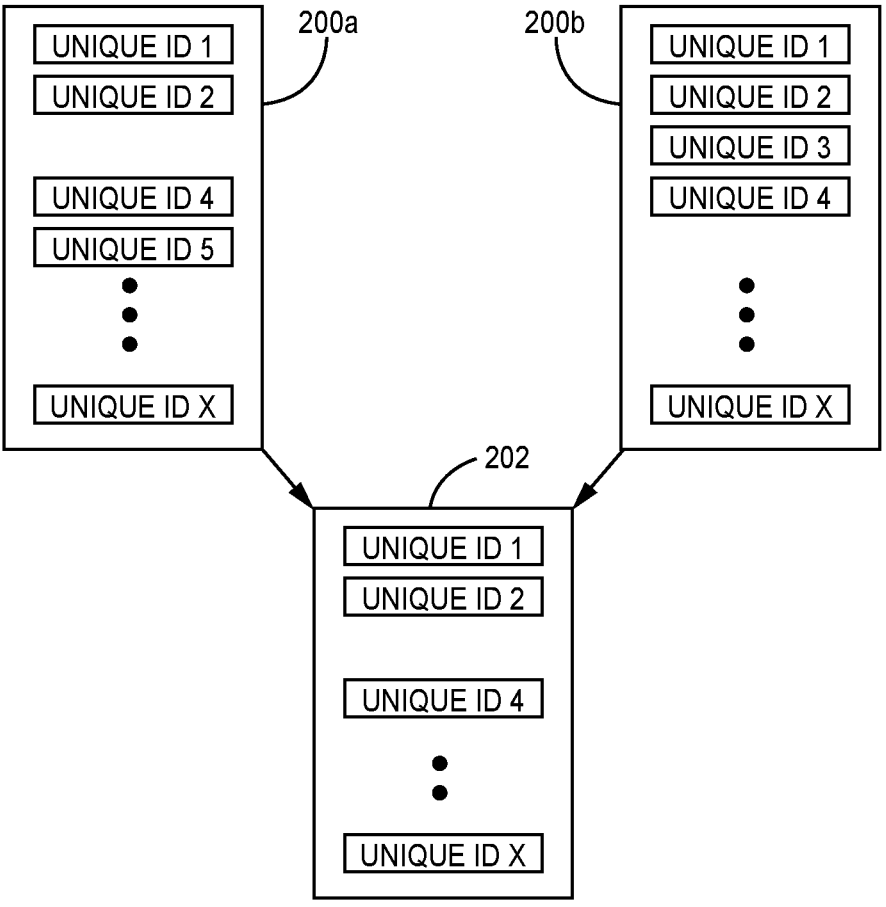
FIG. 2 is a block diagram illustrating visually a method of structuring ledgers into a central ledger according to some embodiments.

Referring now to FIG. 2, a method of authenticating devices for use is provided according to some embodiments. In particular, FIG. 2 is a block diagram that illustrates visually the modification of the local ledgers and subsequent combination of the local ledgers into a centralized ledger. In this embodiment, modified local ledger 200a is received from a first local system, in which a medical device having a unique identification or serial number (i.e., UNIQUE ID 3) was utilized. As a result, the unique identification corresponding with UNIQUE ID 3 has been deleted from the modified local ledger 200a. In addition, modified local ledger 200b is received from a second local system in which a medical device having a unique identification (i.e., UNIQUE ID 5) was utilized. As a result, the unique identification corresponding with UNIQUE ID 5 has been deleted from the modified local ledger 200b.

In some embodiments, each modified local ledger 200a, 200b is compared to the central ledger 202, wherein the central ledger 202 is updated to reflect changes between the modified local ledgers 200a, 200b and the centralized ledger 202. For example, in the embodiment shown in FIG. 2, the modified local ledger 200a is compared to the central ledger 202 (prior to updating) and as a result of the comparison deletion of UNIQUE ID 3 is detected. The central ledger 202 is then updated to reflect the deletion of UNIQUE ID 3. The same process is repeated with respect to each received modified local ledger 200a, 200b. In this embodiment, unique identification values are only deleted from the central ledger 202. That is, having removed UNIQUE ID 3 from the central ledger 202, a comparison of the central ledger 202 to modified local ledger 200b does not result in UNIQUE ID 3 being added back to the central ledger because of the presence of UNIQUE ID 3 in the modified local ledger 200b. In other embodiments, rather than compare each modified local ledger 200a, 200b to the centralized ledger 202, the modified local ledgers 200a, 200b are compared to one another and then utilized to update the central ledger.

The modified central ledger 202—which reflects the updates made to each of the modified local ledgers 200a, 200b—is then distributed to each of the plurality of local systems. In this embodiment, the central ledger 202 only stores data associated with those unique identifiers that may still be utilized. Unique identifiers deleted from the modified local ledgers 200a, 200b are deleted from the central ledger 202. In some embodiments, the deletion of data from central ledger 202 in response to unique identifiers being utilized ensures that the size of the database remains relatively manageable. That is, the central ledger 202 and corresponding local ledgers 200a, 200b are only required to store information associated with active unique identifiers, not a full list of all unique identifiers ever associated with the system.

Figure 3:
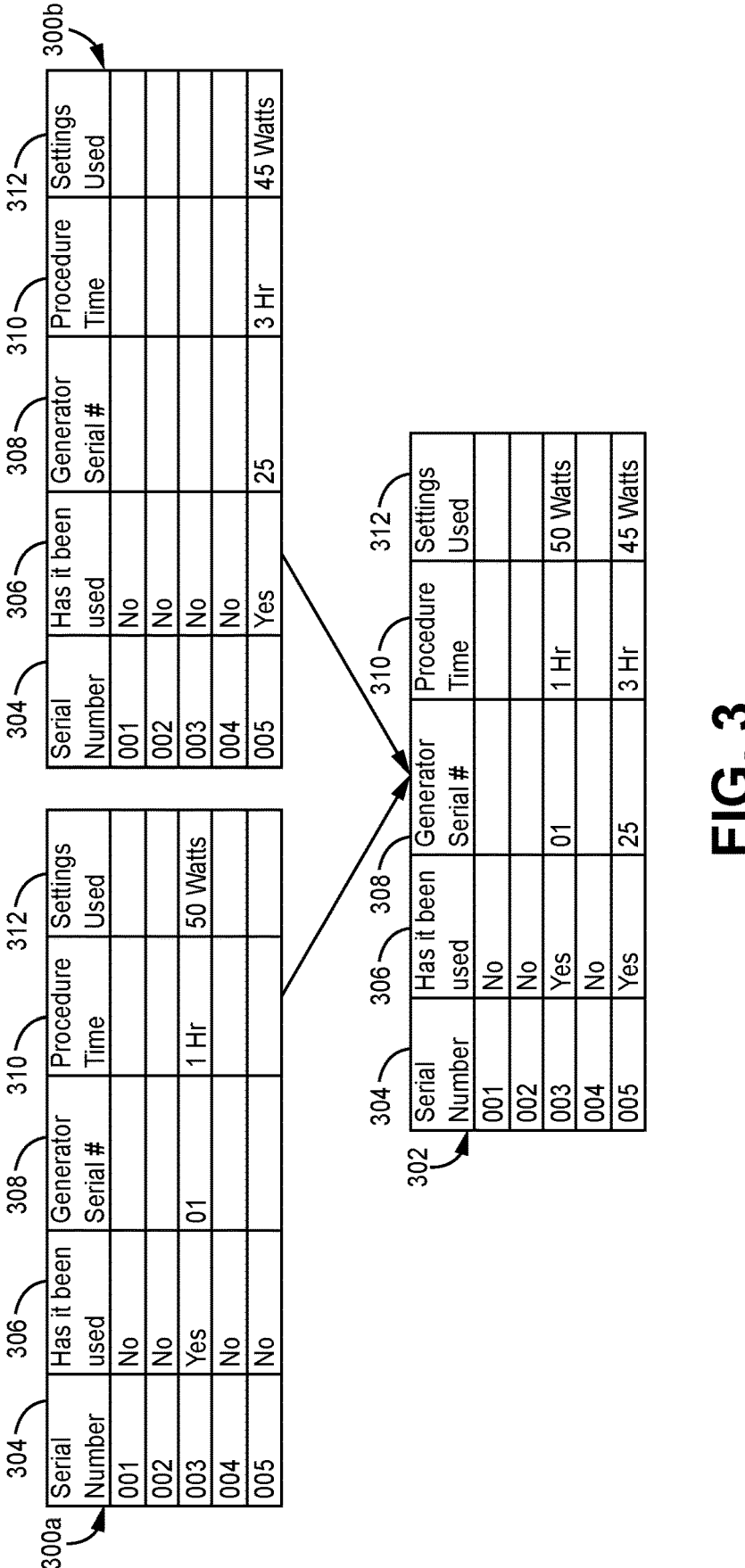
FIG. 3 is a block diagram illustrating visually a method of structuring ledgers and combining ledgers into a central ledger according to some embodiments.

Referring now to FIG. 3, a method of authenticating user devices according to another embodiment is provided. In particular, FIG. 3 is a block diagram illustrating visually the modification/updating of local ledgers 300a, 300b and subsequent modification/updating of the central ledger 302. In this example, the first local ledger 300a has been modified/updated to reflect use of the medical device associated with UNIQUE IDENTIFIER 3. Likewise, second local ledger 300b has been modified/updated to reflect use of the medical device associated with UNIQUE IDENTIFIER 5. In some embodiments, additional data may be associated with each entry. For example, in some embodiments in addition to the unique identifier or serial number field 304, each entry may further include information regarding use of the device, including for example a use field 306, generator serial number field 308 (identifying the local system with which the device was used), procedure time field 310, and procedure setting field (for example, power setting of the procedure). In other embodiments, a variety of other metrics or values may be stored with respect to each entry. For example, each entry may include a flag that identifies whether the entry has been modified by the local system.

The modified local ledgers 300a and 300b are received at the central ledger 302, which is then updated to incorporate each of the modifications/updates reflected in the local ledgers 300a, 300b. In some embodiments, the central ledger 302 is compared to the local ledgers 300a, 300b to detect differences. In other embodiments, a flag may be set within the modified local ledgers 300a, 300b indicating those entries that have been modified/updated by the respective local system, wherein the central ledger 302 utilizes the flags to determine the entries within the central ledger 302 to be updated/modified.

In contrast with the embodiment shown in FIG. 2, database entries are not deleted. Rather, entries are updated/modified over time to reflect use of the medical devices. For example, expiration of the device after one or more uses is reflected in the updates/modifications made to the centralized database 302 but does not result in deletion of the entry from the centralized database 302. As a result, the size of the centralized ledger 302 will increase in size as new devices are added but will retain information regarding the use of devices. Having updated the central ledger 302 to incorporate the modified local ledgers 300a, 300b, the central ledger 302 is distributed to the plurality of local systems to replace/update the local ledgers.

Figure 4:
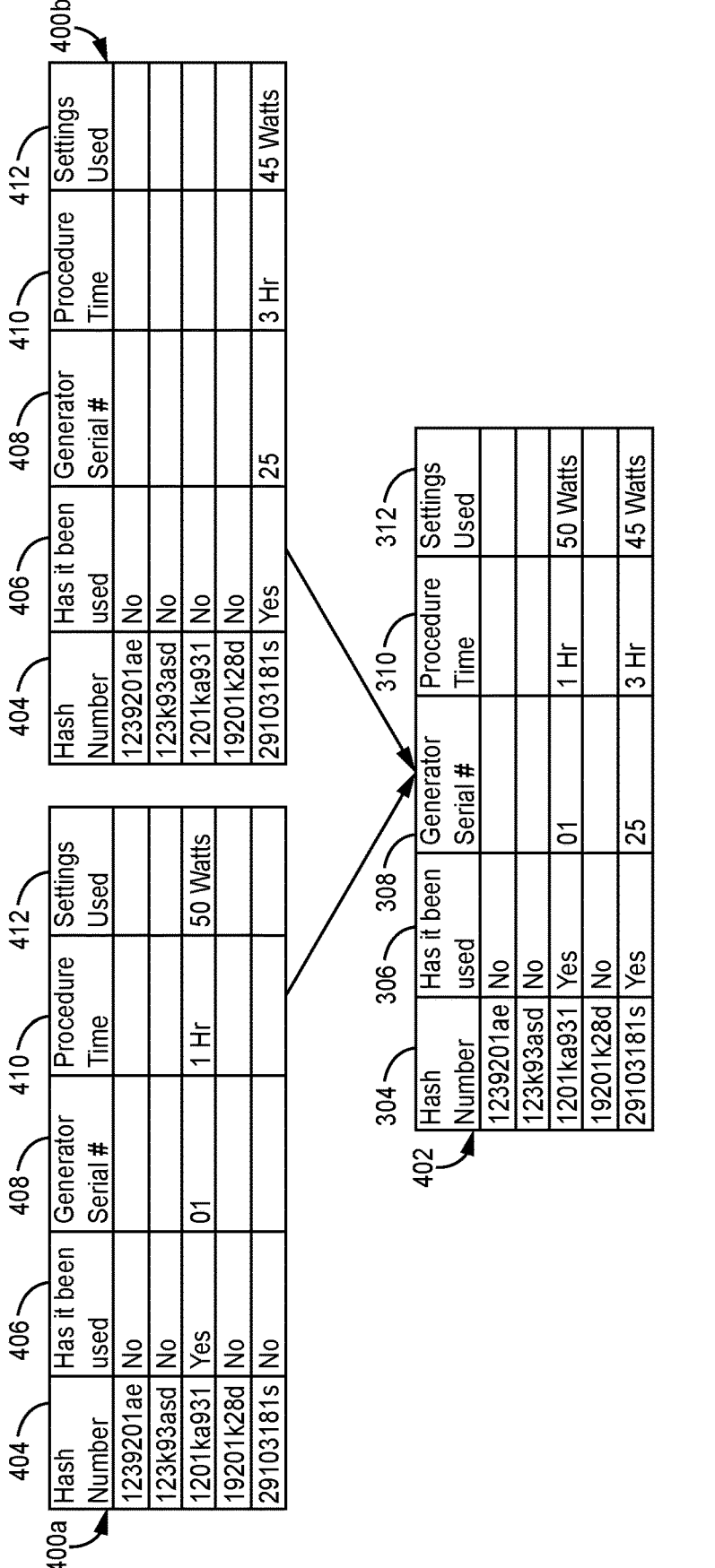
FIG. 4 is a block diagram illustrating visually a method of structuring ledgers and combining ledgers into a central ledger according to some embodiments.
Figure 5:
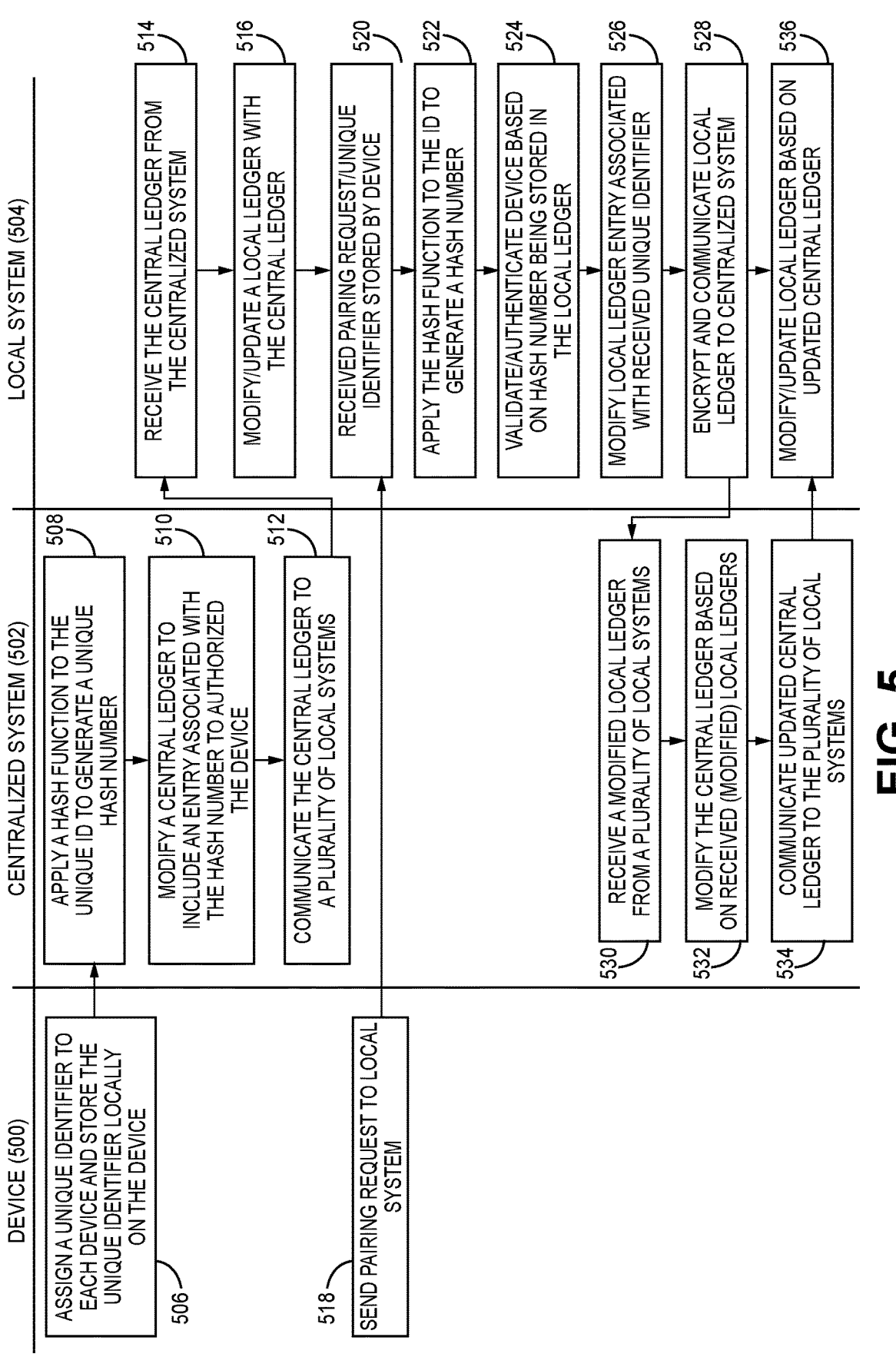
FIG. 5 is a swimlane diagram illustrating functions per-formed by a device, a centralized system, and a local system to authenticate devices using a central ledger according to some embodiments.

Referring now to FIGS. 4 and 5, a method of authenticating devices through the maintenance of a centralized ledger and distributed local ledgers is illustrated that includes additional security/authentication measures. FIG. 4 is a block diagram illustrating visually the modification of a first local ledger 400a and a second local ledger 400b and subsequent updating/modification of a central ledger 402 based on the first and second local ledgers 400a. 400b. FIG. 5 is a swimlane diagram illustrating steps performed on the device, the centralized system, and one of the local systems according to some embodiments to implement the centralized ledger system.

In contrast with the embodiment shown in FIG. 3, the ledgers—including modified local ledgers 400a and 400b and central ledger 402—utilize a unique identifier that is the result of a hash function performed on the unique identifier or serial number (SN) associated with each device. A hash function operates on an input of variable size and returns a fixed-length output, referred to as the "hash number". Cryptographic hash functions operate as one-way operations, meaning that it is extremely difficult to determine the input from the hashed output. In some embodiments, well-known hash functions such as Secure Hash Algorithm (SHA-1) may be utilized to generate the hash numbers from the unique identifiers associated with each device. In some embodiments, this prevents an unauthorized user from being able to determine the unique identifier (e.g., serial number) associated with unused devices and then modifying or copying the unique identifier onto reprocessed devices. In some embodiments, standard hashing functions may be utilized to generate the hash number. In other embodiments, non-standard hashing functions unique to the centralized ledger system may be utilized. In some embodiments, use of a standard hashing function is sufficient to prevent users having unauthorized access to the ledger to determine the unique identifiers or serial numbers associated with unused medical devices, but does not prevent unauthorized users from generating valid hash numbers given access to a list of unique identifiers or serial numbers. Utilization of a non-standard hashing function may prevent unauthorized users from both backing out/determining unique identifiers/serial numbers from the hashed number and prevent unauthorized users from creating valid hash numbers given access to unique identifiers/serial numbers. In the embodiment shown in FIG. 4, each ledger entry includes a plurality of fields, including a device hash number field 404 (as described above), a use field 406, a generator serial number field 408 (storing information related to the local system which utilizes the medical device in operation), procedure time field 410, and a settings field 412. In other embodiments, additional (or fewer) fields may be stored with respect to each entry.

During operation, the local system would read the unique identifier or SN from the device and apply the hash function to generate a hash number. The generated hash number would be compared to the localized ledger 400a or 400b to determine whether the device is authorized for use. In response to authorized use of the medical device at a local system, the local ledger is updated to reflect the authorized use. As discussed above, this may include identifying that the device has been used, recording the serial number of the local system that utilized the device, the length of time of the procedure, and/or the settings of the use (e.g., wattage used, etc.).

As discussed above, authorized use of a device at a local system results in the local system modifying/updating the entry associated with the device utilized. The modified local ledgers 400a and/or 400b are communicated to the central ledger 402 and updates/modifications are made to the central ledger 402 to reflect the changes made to each of the local ledgers 400a, 400b. The updated centralized ledge 402 would then be distributed to the plurality of local systems for use.

Referring to FIG. 5, the swim lane diagram illustrates steps performed by the device 500 to be authenticated, the centralized system 502, and the local system 504. At step 506, a unique identifier is assigned to the device and is stored locally on the device 500. In some embodiments, the unique identifier is stored to non-volatile memory on the device (e.g., EEPROM).

To authorize the device for use, an entry corresponding to the device must be added to the central ledger maintained by the centralized system 502 At steps 508 and 510, the centralized system 502 creates an entry on the central ledger for the device 500. At step 508 the centralized system 502 applies a hash function to the unique identifier to generate a device hash number. In some embodiments, well-known cryptographic hash functions may be utilized to generate the hash number such as SHA-1. In general, a cryptographic hash function is a one-way function in which a particular input always produces the same output. In addition, given the output there is no feasible way to determine the input. In some embodiments, the input to the hash function may be variable in length, wherein the output of the hash function is a fixed length. At step 510, an entry is created in the central ledger that represents the device 502. However, rather than store the unique identifier associated with the device 502, the entry in the central ledger utilizes the device hash number generated at step 508. This is illustrated in the embodiment shown in FIG. 4, in which entries included in the central ledger 402 are identified by device hash number field 404.

At step 512, the central ledger is communicated to each of the plurality of local systems, including local system 504. In some embodiments the central ledger is encrypted for communication to the local systems. In addition, the hash function utilized to generate the device hash number at step 508 is also provided to the plurality of local systems. In some embodiments, the hash function may be pre-installed on the local system 504. In other embodiments, the hash function may be securely communicated to the local system 504. At step 514, the central ledger is received by local system 504. At step 516, the previous version of the local ledger is updated based on the received central ledger. In some embodiments, the previous local ledger is discarded and replaced with the central ledger, which represents the most up-to-date information on devices authorized for use.

At step 518, a device 500 sends a pairing request to the local system 504. In some embodiments the pairing request may include the unique device identifier stored on the device. In other embodiments, the device identifier may be subsequently communicated in response to a request from the local system 504. At step 520, the pairing request is received by the local system 504. At step 522, the local system 504 applies the stored hash function to the unique device identifier to generate a device hash number. The hash function applied at step 522 is the same as the hash function applied at step 508 to generate the hash number stored to the central ledger. Given the same input, the hash function generates the same output.

At step 524, the device hash number generated at step 522 is compared to the local ledger to determine whether the device has been authorized for use. If the device hash number generated at step 522 is not located in the local ledger stored by the local system 504, then the device 500 is not authorized for use. If the hash number generated at step 522 is located in the local ledger—and the entry identifies the device 500 as eligible for use—then the device 500 is authorized to be used in conjunction with the local system 504. If the hash number generated at step 522 is located in the local ledger—and the entry identifies the device 500 has already been used or is otherwise not eligible for use—then the device 500 is not authorized to be used in conjunction with the local system 504.

At step 526, the local system 504 modifies or updates the local ledger to reflect the use of the device 504. In some embodiments, this may include deletion of the entry corresponding to the device from the local ledger. In other embodiments, modifying/updating the local ledger includes modifying the entry associated with the device utilized. For example, this may include modifying the entry to indicate that the device has been used (e.g., as indicated by the device use field 406 shown in FIG. 4). In other embodiments, this may include modifying the entry to record one or more aspects of the use, including for example the length of the procedure (e.g., procedure length field 410), identification of the local system that utilized the device, the date of the use, etc.

At step 528, the local system 504 communicates the modified local ledger to the centralized system 502. In some embodiments, the modified local ledger is communicated electronically and may be encrypted prior to being communicated to the centralized system 502. In some embodiments, the modified local ledger is communicated via copying of the modified local ledger to a computer readable medium and then manually communicated to the centralized system.

At step 530, the modified local ledger is received at the centralized system 502. At step 532, the central ledger is modified based on the received, modified local ledger-which may include modifying the central ledger based on a plurality of modified local ledgers received from a plurality of different local systems 504. In some embodiments, modifying the central ledger includes removing entries that have been deleted from received modified local ledger. In other embodiments, modifying the central ledger includes modifying entries to reflect the modifications provided in the modified local ledger. For example, modification of entries may include identifying that the corresponding device has been utilized, the length of time the device was utilized, the local system with which the device was utilized, etc.

At step 534, the updated central ledger is communicated to the plurality of local systems 504. In some embodiments, the updated central ledger may be communicated electronically and may include encryption of the updated central ledger prior to communication. In other embodiments, the updated central ledger may be recorded onto a computer readable medium and communicated manually to each of the plurality of local servers 504.

At step 536, the local system 504 replaces the local ledger with the updated central ledger received from the centralized system 502. In this way, each of the local systems 504 includes a local ledger that reflects the use of devices by other local systems and can be utilized to prevent the unauthorized reuse of medical devices.

Figure 6:
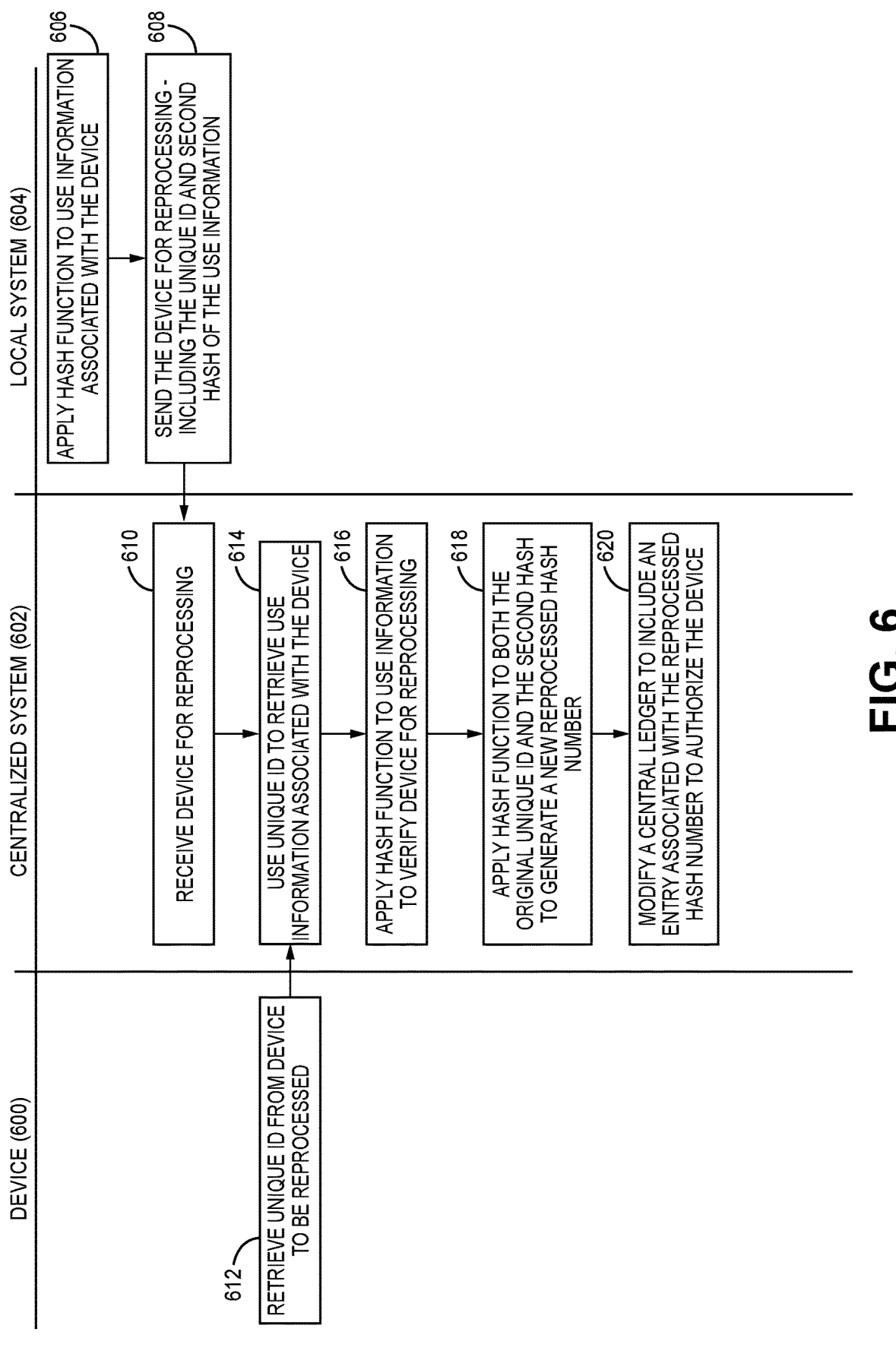
FIG. 6 is a swimlane diagram illustrating functions per-formed by a device, a centralized system, and a local system to reprocess a device using a central ledger system according to some embodiments.

FIG. 6 is a flowchart illustrating a method of securely reprocessing medical devices. The flowchart illustrates the steps performed by a medical device 600, centralized system 602 and the local system 604. The process is initiated with the use of a medical device 600 by a local system 604. As described with respect to FIG. 5, the local ledger would be updated to indicate the use of the device 600. At step 606, the local system applies the hash function to the use information to generate a second hash number. The second hash number may be subsequently utilized to verify the reprocessing of the medical device 600. For example, the modified local ledger will include the user information associated with the medical device 600. Application of the hash function to the use information stored on the modified local ledger may be utilized to verify the device to be reprocessed. In some embodiments, to improve security information the hash function is applied to information related to the medical device 600 that would be unknown to potential third-party reprocessors. For example, in some embodiments the hash function is applied to the use information associated with the medical device to generate a second hash number (i.e., a use hash number) separate from the device hash number (i.e., first hash number) created by applying the hash function to the unique identifier associated with the device.

At step 608 the device is sent to the centralized system for reprocessing along with the second hash number (i.e., use hash number) and the modified local ledger. In some embodiments, the use hash number is stored on the modified local ledger that is communicated to the centralized system 602 as part of the process described with respect to FIG. 5. In other embodiments, the use hash number is sent separately from the modified local ledger. In some embodiment, the use hash number is sent along with the unique identifier associated with the device to be reprocessed.

At step 610, the centralized system 602 receives the device for reprocessing. The centralized system referred to in this embodiment does not need to be physically located at the same location that stores the centralized ledger (described with respect to FIG. 5), but may be in some embodiments. At step 612, a unique identifier is retrieved from the device to be reprocessed. In some embodiments, the unique identifier is read from the device itself as shown in FIG. 6. In other embodiments, the unique identifier is communicated to the centralized system 602 along with the use hash number and does not need to be retrieved from the unique identifier.

At step 614, the centralized system 602 utilizes the unique identifier received from the device 600 to retrieve use information associated with the device and stored on the modified local ledger received from local system 604. For example, in some embodiments the unique identifier is utilized to retrieve records from the central ledger. In other embodiments, it may be necessary to apply the hash function to the unique identifier in order to retrieve the first hash number utilized by the central ledger to identify the device. Based on the unique identifier and/or the first hash number, the use information associated with the device is obtained.

At step 616, the hash function is applied to the use information and is compared with the second hash number received from the local system to verify reprocessing of the device. If the hash number generated at step 616 matches the second hash number received from the local system, then the device is verified for reprocessing.

To re-authenticate the device for use, the central ledger is modified. In some embodiments, the entry of the central ledger associated with the device identifier is modified to indicate that the device is eligible for use again. This may include modifying fields that previously indicated that the device had been previously used or was otherwise ineligible for use to indicate the eligibility of the device. In other embodiments, rather than modify the existing field (and lose the data associated with the initial use of the device), a new entry is added to the ledger for the device. The new entry requires a unique identifier. In the embodiment shown in FIG. 6, the unique identifier is generated at step 618 by applying the hash function to both the original unique identifier associated with the device and the use hash number to generate a new reprocessed hash number. Both the unique identifier and the use information are available to local systems 604 seeking to authenticate the device. For example, the unique identifier is retrieved from the device itself and the use information is stored in the local ledger. Thus, a local system 604 seeking to authenticate a device 600 receives the unique identifier from the device itself, utilizes the unique identifier (perhaps via a hash function) to retrieve use information associated with the device. The hash function is applied to the retrieved use information and unique identifier to obtain the new reprocessed hash number to authenticate the reprocessed device. At step 620, the reprocessed hash number is added to the central ledger in order to authorize the reprocessed device for subsequent use.

Figure 7:
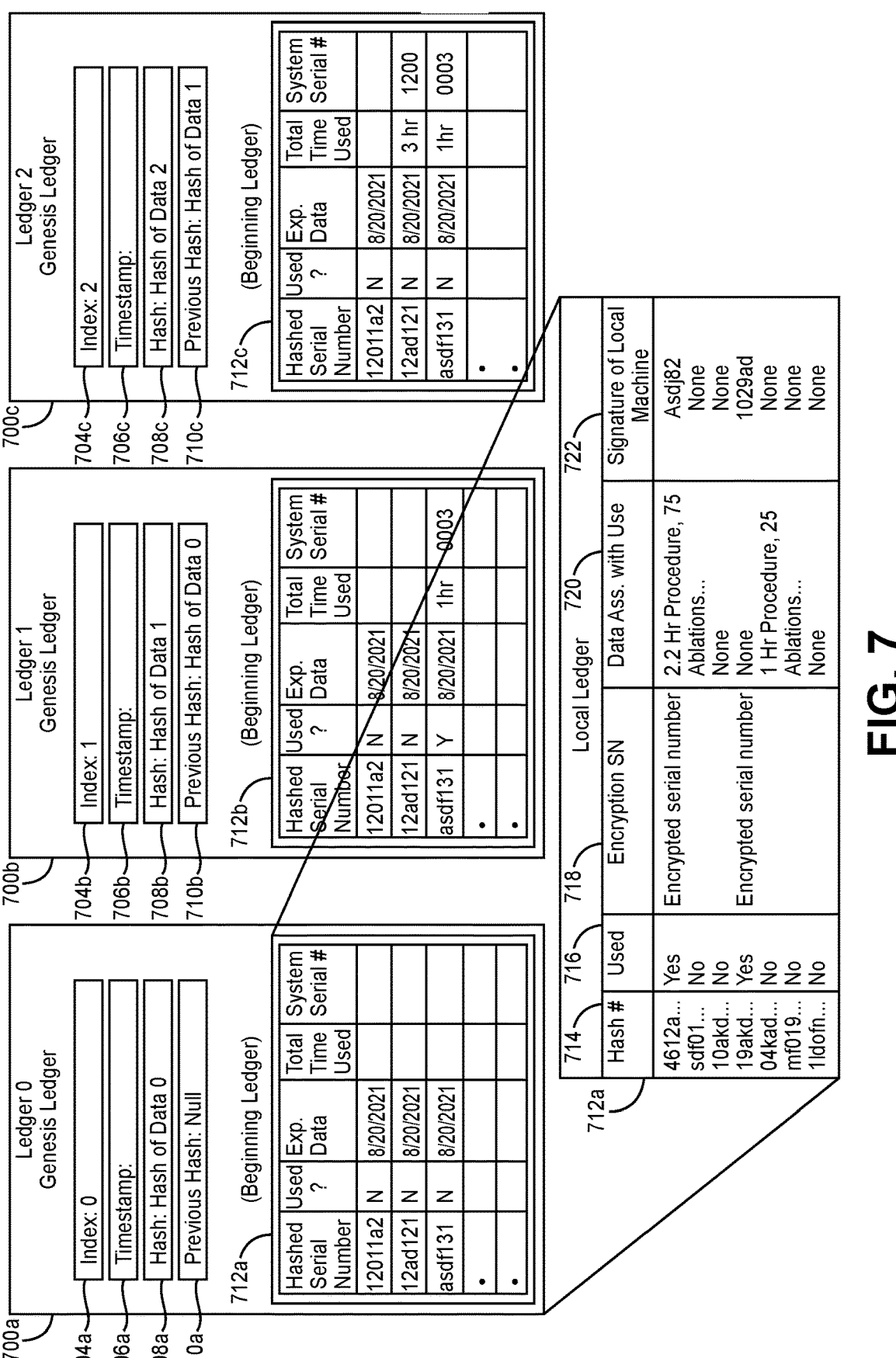
FIG. 7 is a block diagram of a centralized ledger that utilizes blockchain entries according to some embodiments.

FIG. 7 is a block diagram that illustrates the use of blockchain in the distribution of central ledger. Blockchain operates by cryptographically linking together subsequent iterations of the ledger. For example, in the embodiment shown in FIG. 7, the blockchain consists of three blocks 700a, 700b, and 700c. Each block represents an iteration of the ledger distributed to the plurality of local systems. The first block 700a represents the first iteration of the ledger and includes a plurality of fields, including an index field 704a, a timestamp field 706a, a hash number field 708a, a previous hash field 710a, and the ledger itself 712a. In this embodiment, the ledger 712a takes the same form as the ledger shown in FIG. 4, which for each entry includes a unique hash number generated based on the unique identifier of authorized medical devices, along with other fields identifying—for example—whether the device has been used, expiration date of the device, total time the device has been used, and the serial number of the local system in which the device was utilized.

However, rather than communicate the centralized ledger to each of the plurality of local systems, the embodiment shown in FIG. 7 utilizes a blockchain to ensure the integrity of the ledger. One of the benefits of utilizing a blockchain is that data is not lost. Each iteration of the centralized ledger to be distributed to the local systems results in the generation of another block added to the end of the blockchain, while retaining the data associated with previous blocks.

In the embodiment shown in FIG. 7, the first block includes a hash field 708a, which is the result of applying a hash function to the contents of the ledger 712a. In some embodiments, the hash function is a cryptographic hash function that generates a fixed length output based on a various length input. The same characteristics of the cryptographic hash function described above to generate a hash number based on the unique identifier are utilized to generate a hash number based on the contents of the ledger 712a. The subsequent block in the blockchain (in this case, block 700b) is linked to the previous block 700a by the previous hash field 710b. Adding new blocks to the block-chain requires the hash of the previous ledger, as described in more detail below.

Figure 8B:
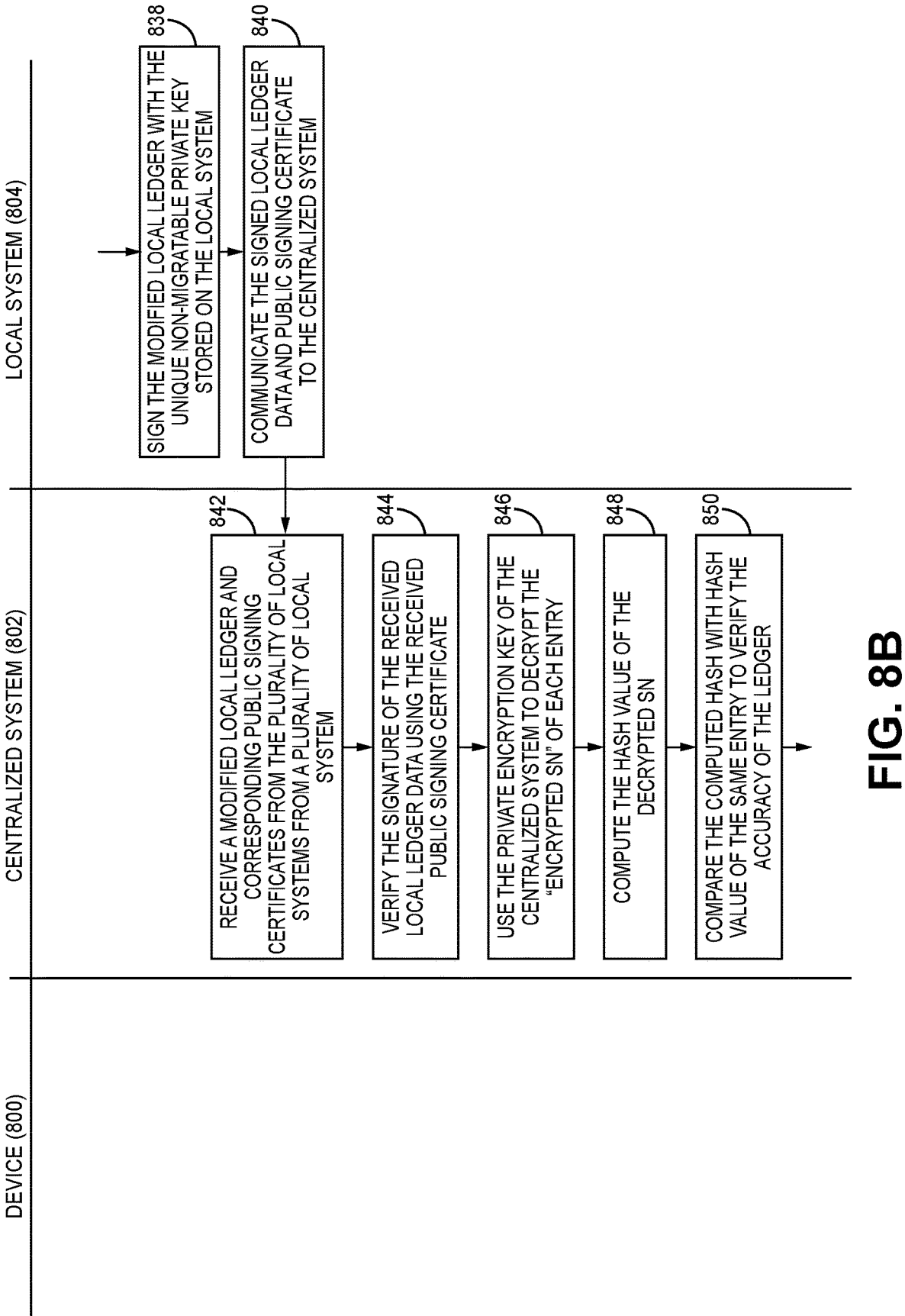
Figure 8C:
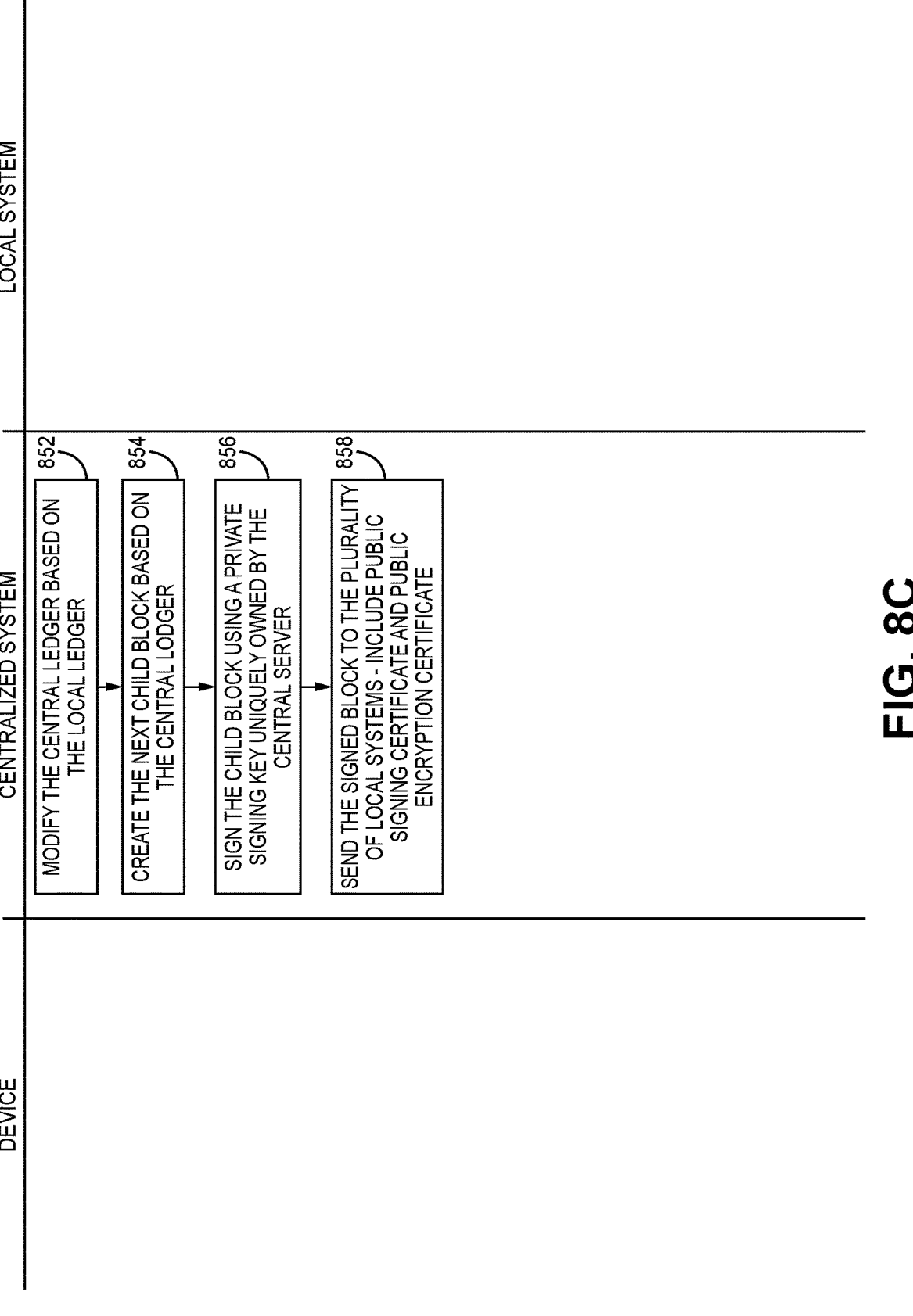

As described above with respect to FIGS. 2-4, a plurality of different fields may be included in the ledgers to enhance security. For example, in some embodiments the ledger may include simply a unique device identifier and an indication regarding whether the device has been used or not (or whether the device is authorized for use). In other embodiments, additional fields may be included regarding the length of time the device has been used, the date of use, etc. In still other embodiments, rather than a unique device identifier the device may be represented by a unique hash number generated based on the unique device identifier. In the embodiment shown in FIG. 7, the ledger includes a plurality of fields, including a device hash number 714, used/not used field 716, an encrypted serial number (SN) field 718, a procedure use field 720, and a local machine signature field 722. As described in more detail in FIGS. 8A-8C, the hash number field 714 and the encrypted SN field 718, and local machine signature field 722 are utilized to enhance the security of the centralized authentication system.

FIG. 8 is a swimlane diagram that illustrates steps performed by the local device 800, the centralized system 802 and the local system 804 to implement a centralized authentication system according to some embodiments. As described in more detail below, the centralized authentication system utilizes a blockchain ledger (for example, as described with respect to FIG. 7). For the sake of clarity, reference is made to the example illustrated in FIG. 7. In the embodiment shown in FIG. 8, each entry in the ledger contains both a cryptographic hash value of the device serial number (device hash 714 shown in FIG. 7) as well as an asymmetrically encrypted device serial number (encrypted SN field 718 shown in FIG. 7) created by the local system to provide proof of physical possession of the device 800 to the centralized system 802.

The centralized system 702 includes two pairs of private keys/public keys or public certificates. The first private key is utilized by the centralized system 802 to sign the block-chain blocks prior to distribution to the plurality of local systems 804. The local systems 804 utilizes the corresponding public signing certificate that comes with the signed data to verify the signature of the received data—in this case blocks including the most recent ledger information. The second private key/public certificate pair is utilized to encrypt the device serial number. In particular, the local system 804 utilizes the public certificate to encrypt the serial number of the device utilized by the local system, wherein the encrypted SN is stored in the local ledger at field 718. The centralized system 802 utilizes the second private key to decrypt the encrypted SN to verify physical possession of the device In addition, in some embodiments each local system 804 includes a pair of non-migratable and unique private key/public key certificates to utilize for signing. Each local system 804 utilizes the private key to sign the modified local ledger prior to communicating the modified local ledger back to the centralized system 802 for updating. The centralized system utilizes the public key certification to decrypt the received modified local ledger, as described in more detail below with respect to the swimlane diagram. In some embodiments, the non-migratable unique private key allows the centralized system 802 to verify the authenticity, integrity and non-repudiation of the modified local ledger received from each local system 804.

At step 806, a unique identifier is assigned to the device and is stored locally on the device. In some embodiments, the unique identifier is stored to non-volatile memory on the device (e.g., EEPROM).

At steps 808 and 810, the centralized system 802 creates an entry on the central ledger for the device 800. At step 808 the centralized system 802 applies a hash function to the unique identifier to generate a hash number. In some embodiments, well-known cryptographic hash functions may be utilized to generate the hash number such as SHA-1. In general, a cryptographic hash function is a one-way function in which a particular input always produces the same output. In addition, given the output there is no feasible way to determine the input. In some embodiments, the input to the hash function may be variable in length, wherein the output of the hash function is a fixed length. At step 810, an entry is created in the central ledger that represents the device 802. However, rather than store the unique identifier associated with the device 802, the entry in the central ledger utilizes the hash number. For example, in the embodiment shown in FIG. 7 each entry in the ledger includes a device hash field 714, a use field 716, an encrypted SN field 718, a device use field 720 and a local machine signature field 722. The device hash field 714 stores the hash number generated as a result of applying the hash function to the unique device identifier. The use field described whether the device has been used or not (e.g., yes or no). The encrypted SN field is utilized by the local system to generate an additional level of verification, described in more detail below. The device use field 720 stores information related to the procedure with which the device was used, and the local machine signature field 722 stores the signature or identification of the local system or machine with which the device was utilized.

At step 812 a block is generated based on the central ledger. For example, if this is the first iteration of the central ledger, then the block generated at step 812 is the first block (e.g., genesis block 700a) in the blockchain. As shown in FIG. 7, each block consists of a plurality of fields as well as the centralized ledger itself. In the embodiment shown in FIG. 7, the plurality of fields include an index field 704a, timestamp field 706a, block hash 708a, previous block hash 710a, and ledger 712a. The index field 704a of the block will be set to '0' to represent the block as the first or genesis block. For each subsequent block, the index field is incremented (e.g., the index field 704*b* for block 700*b* is set to '1', the index field 704*c* for block 700*c* is set to '2', etc.). Likewise, the date/time the block was created is added to the timestamp field 706*a*. The previous hash field 710*a* stores the hash value of the previous block. With respect to the first block in the blockchain, the previous hash field 710*a* is assigned a null value. Subsequent previous hash fields— such as previous hash field 710*b* associated with block 700*b* is assigned the hash value of the previous block—in this case the hash number stored in hash field 708*a*. The hash field 708*a* is generated by applying a hash function to the entire block—including the ledger 712*a*. As described above, a cryptographic hash function can be applied to a variable length input and still provide a fixed length output. In addition, the cryptographic hash function is a one-way function, wherein the same input will provide the same output, but calculating the input from the output is not feasible (except for by brute force). In some embodiments the hash function applied to the unique identifier to generate the unique hash number associated with a particular device and stored as part of the ledger (e.g., hash number 714) may be the same or a different hash function applied to the block to generate the hash number stored to hash field 708*a*. For the sake of simplicity, the hash field 708*a* is referred to as the block hash field 708*a* and the unique device hash is referred to as device hash field 714.

At step 814, the block is signed (i.e., encrypted) using a first private key associated with the centralized server 802. At step 816 the signed (i.e., encrypted) block is communicated to the plurality of local systems 804. In some embodiments, the public key/certificate is also communicated along with the signed block. In other embodiments, the public key/certificate is maintained locally by the plurality of local systems 804.

At step 820, the signed block is received at the local system 804 from the centralized system 802. At step 822, the public key/certificate is utilized to authenticate the signed block. If authenticated, then at step 824 the local system 804 verifies that the signed block is a child of the previous block in the blockchain based on a comparison of the block hash field (e.g., 708*a* shown in FIG. 7) of the previous block and the previous block hash field (e.g., 710*b*) of the current block. A discrepancy in the block hash field and the previous block hash field indicates that the received block is not the next block in the blockchain and should therefore be rejected. Assuming the fields match, then the received block is verified as a child of the previous block and therefore represents current or "good" data and at step 826 the local ledger is modified to incorporate the data received form the verified block. In some embodiments, the local ledger is replaced with the local ledger associated with the received and verified block. In other embodiments, the local ledger is modified to incorporate changes indicated in the received and verified block.

At step 827, a device 800 sends a pairing request to the local system 804. In some embodiments, the pairing request includes the unique identifier or serial number (SN) associated with the device. At step 828 the local system 804 receives the pairing request and the unique identifier. At step 830 the local system 804 applies the hash function to the unique identifier to generate a hash number. As described above, the hash function applied by the local system 804 is the same as the hash function applied by the centralized system 802 at step 808. At step 832 the device hash number generated at step 830 based on the unique identifier received from the device 800 is compared to the local ledger stored by the local system 804, in which one of three outcomes is possible. In the first outcome, an entry corresponding with the device hash number generated at step 830 is not found in the local ledger, which prevents the device from being authorized for use. In this event, a message or alert is generated that prevents the device from being utilized with the local system 804. In the second outcome, an entry corresponding with the device hash number generated at step 830 is found in the local ledger, but the entry indicates that the device has already been used or is otherwise not authorized for use (e.g., has exceeded a threshold number of uses, etc.). Once again, a message or alert is generated that prevents the device from being utilized with the local system. In some embodiments, no action is taken with respect to modifying the local ledger based on the failed attempts to authenticate a device. In other embodiments, identification of the device is retained or stored-either in a separate database or by modifying the local ledger to indicate the failed authentication attempt. In the third outcome, an entry corresponding with the device hash number generated at step 830 is located in the local ledger, and the entry indicates that the device has not been used or is otherwise authorized for use. In this instance, at step 832 a message or alert is generated authorizing the device for use with the local system 804.

At steps 834 and 836, the local ledger is modified to indicate the use of the device 800. In some embodiments, at step 834 the public key certificate associated with the second private/public key pair is utilized by the local ledger to encrypt the unique identifier or serial number (SN) of the device. The entry in the local ledger corresponding with the device is modified to include the encrypted SN in the encrypted SN field 718. Likewise, at step 836 the entry in the local ledger corresponding with the device is modified to indicate or describe the use of the device with the local system 804. For example, this may include modifying the use field 716 to indicate that the corresponding device has been used, and may further include modifying the device use field 720 to describe the particulars of the device use (e.g., procedure, length of procedure, power, etc.). In some embodiments, modifying the local ledger entry associated with the identified device at step 836 further includes identifying the local system with which the device 800 was utilized.

At step 838, the modified local ledger is signed using the unique non-migratable private key stored on the local system 804. At step 840, the signed, modified local ledger is communicated to the centralized system 802 along with a public signing certificate. In some embodiments, only the signed (and modified) local ledger is communicated to the centralized system 802 (rather than a block that includes the modified local ledger). However, in other embodiments a new block may be generated and the new block may be communicated to the centralized system 802.

At step 842, the centralized system 802 received the signed (and modified) local ledger and corresponding public signing certificates from each of the plurality of local systems 804. At step 844 the centralized system 802 verifies the signature of the received local ledger using the received public signing certificate. In addition, at step 846 the centralized system 802 utilizes the second private encryption key to decrypt the encrypted SN field 718 associated with the local ledger. Decrypting the encrypted SN field 718 provides the serial number of the device associated with the entry. At step 848, the hash function (same hash function utilized at step 808) is applied to the decrypted SN field 718 to generate a device hash number that can be checked or verified against the device hash field 714 associated with each entry. This step verifies that the local system 804 had physical possession of the device based on the local system 804 reading the unique identifier or SN from the device itself. Without physical possession of the device, the local system 804 would have no access to the unique device identifier or SN, only to the device hash number associated with entries within the ledger. In some embodiments, if the computed device hash number does not correspond with the entry with which it is associated, then the entry is invalidated. In some embodiments, if the computed device hash number does not correspond with the entry with which it is associated, then the local ledger is invalidated in its entirety.

Assuming the integrity of the received local ledger is confirmed, then at step 852 the central ledger stored by the centralized ledger system 802 is modified based on the received local ledger. As described previously, this may include removing entries from the central ledger or modifying entries to indicate use of one or more devices. In addition, although not shown, modification of the central ledger may also include adding additional entries to the central ledger representing newly authorized devices. In addition, in some embodiments the encrypted SN field is deleted so that the central ledger does not include any encrypted SN values.

At step 854, a new block is created that will be added that includes the updated or modified central ledger. The steps for creating the new block are the same as those described with respect to step 812 above. This includes incrementing the index field 704 (shown in FIG. 1), the timestamp field 706, and the previous hash field 710. In addition, this includes applying the hash function to the new block to create a new block hash number stored in field 708.

At step 856 the new block is signed using the first private key associated with the centralized system 802. The private key utilized at step 856 is the same private key utilized at step 814. At step 858, the signed block is sent to the plurality of local systems 804 along with the public key certification (i.e., public encryption certificate) associated with the private key utilized at step 856.

In this way, the disclosure presents a centralized ledger system utilized to authenticate use of medical devices.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

According to one aspect, a method of authenticating devices includes storing a unique identifier locally on each device. The method may further include modifying a central ledger located on a centralized system to include an entry associated with the unique identifier stored locally on the device and then communicating the central ledger to a plurality of local systems, wherein each of the local systems stores the central ledger as a local ledger. The method may further include receiving at one of the local systems a unique identifier from a connected device, and searching the local ledger to verify/authentic the validity of the connected device for use in the local system. The method may further include modifying an entry in the local ledger associated with the unique identifier based on the use of the connected device with the local system and then communicating the modified local ledger from each of the plurality of local systems to the centralized system. The method may further include modifying the central ledger based on the received local ledger and then communicating the modified central ledger to a local system.

The method of the preceding paragraph may optionally include, additionally and/or alternatively, any one or more of the following features, configurations and/or additional components.

For example, in some aspects the inclusion of the unique identifier in the central ledger authorizes the device for use.

In some aspects, modifying an entry in the local ledger associated with the unique identifier includes deleting the entry from the local ledger, wherein deletion of the entry from the local ledger deauthorizes the device for use.

In some aspects, modifying the central ledger based on the received local ledger includes comparing the central ledger with the received local ledger and removing entries from the central ledger that do not appear in the received local ledger.

In some aspects, modifying an entry in the local ledger associated with the unique identifier includes appending to the entry information regarding use of the device by the local system.

In some aspects, modifying a central ledger located on a centralized system to include an entry associated with the unique identifier stored locally on the device may further include applying a cryptographic hash function to the unique identifier to generate a device hash number, wherein the device hash number uniquely identifies the device in the central ledger.

In some aspects, receiving at one of the local systems a unique identifier from a connected device, and searching the local ledger to verify/authenticate the validity of the connected device for use in the local system may further include applying the cryptographic hash function to the unique identifier received from the connected device to generate a device hash number, wherein the local ledger is searched using the device hash number to verify/authenticate the validity of the connected device.

In some aspects, the method may also include creating a block based on the central ledger, wherein the block includes an index field, a hash field, a previous hash field, and the central ledger, wherein the index field stores a value identifying each block in a blockchain, the hash field stores a hash number generated by applying a hash function to the block, and the previous hash field stores a previous hash number corresponding with a previous block in the blockchain.

In some aspects, in response to receiving a central ledger from the central system, the local system may compare the previous hash field to the hash field of a previously block received and stored by the local system to verify that the received block is a child of the previously received block.

In some aspects, modifying an entry in the local ledger associated with the unique identifier based on the use of the connected device with the local system may also include applying a public encryption certificate to the device identifier to generate an encrypted device identifier, wherein the modifying the entry in the local ledger includes adding the encrypted device identifier to the entry.

In some aspects, modifying the central ledger based on the received local ledger may also include applying a private key corresponding with the public encryption certificate to the encrypted device identifier to validate physical possession of the device by the local system that communicated the modified local ledger.

In some aspects, communicating the modified local ledger from each of the plurality of local systems to the centralized system may include signing the modified local ledger using a non-migratable unique private key owned by each of local systems so that the centralized system can verify the authenticity, integrity and non-repudiation of the modified local ledger.

In some aspects, modifying the central ledger based on the received local ledger includes verifying the authenticity and integrity of each of the received local ledgers using the public certificate accompanying each of the received local ledgers.

In some aspects, communicating the modified central ledger to a local system may include signing the modified central ledger by the central ledger system using its unique private key and the transmitting the corresponding public certificate along with the signed central ledger to a local system.

According to another aspect, a centralized ledger system for device authentication includes a centralized system and a local system. The centralized system may be configured to maintain a central ledger comprised of a plurality of entries, wherein the central ledger is modified to include an entry associated with a unique identifier stored locally on a medical device. The local system may be configured to receive the central ledger from the centralized system and to store the central ledger as a local ledger, wherein the local system receives a unique identifier from a medical configured to be used with the local system, wherein the local system authenticates the validity of the medical device based on a comparison of the unique identifier with the local ledger, wherein the local system modifies an entry in the local ledger corresponding with the unique identifier of the medical device connected to the local system and communicates the modified local ledger back to the centralized system for updating of the central ledger based on the modified local ledger.

The centralized ledger system of the preceding paragraph may optionally include, additionally and/or alternatively, any one or more of the following features, configurations and/or additional components.

According to one aspect, the local system may modify an entry in the local ledger corresponding with the unique identifier of the medical device connected in to the local system by deleting the entry, wherein deletion of the entry from the local ledger deauthorizes the device for use, and wherein updating of the central ledger based on the modified local ledger includes comparing the central ledger with the modified local ledger and removing entries from the central ledger that do not appear in the received local ledger.

In some aspects, the centralized system may create a block based on the central ledger, wherein the block includes an index field, a hash field, a previous hash field, and the central ledger, wherein the index field stores a value identifying each block in a blockchain, the hash field stores a hash number generated by applying a hash function to the block, and the previous hash field stores a previous hash number corresponding with a previous block in the blockchain.

In some aspects, in response to receiving a central ledger from the central system, the local system compares the previous hash field to the hash field of a previously block received and stored by the local system to verify that the received block is a child of the previously received block.

According to another aspect, a method of reprocessing a medical device for reuse may include utilizing a medical device identified by a unique identifier in conjunction with a local system, wherein the local system modifies a local ledger to include use information associated with the medical device. The method may further include applying a hash function to the use information associated with the device to generate a first hash of the use information. The medical device to be reprocessed, the modified local ledger, the unique identifier associated with the medical device, and the hash of the use information may then be communicated to a reprocessing center. The method may further include retrieving from the medical device to be reprocessed the unique identifier and utilizing the unique identifier to retrieve use information from the modified local ledger. The method may further include applying the hash function to the retrieved use information to generate a second hash of the use information and comparing the first hash to the second hash to verify the medical device for reprocessing. The method may further include generating a new unique identifier for the medical device based on the unique identifier of the device and one of the first hash or the second hash and modifying the central ledger to include an entry corresponding to the new unique identifier, wherein the new entry authorizes the medical device for reuse.

The method of the preceding paragraph may optionally include, additionally and/or alternatively, any one or more of the following features, configurations and/or additional components.

For example, the method may further include receiving at a local system an unique identifier associated with a reprocessed medical device, applying a hash function to the unique identifier to generate a third hash, and comparing the third hash to the local ledger to identify an entry corresponding with the unique identifier. The method may further include retrieving use information associated with the unique identifier, applying the hash function to the unique identifier and the retrieved use information to generate a fourth hash, and comparing the fourth hash to the local ledger to identify an entry corresponding with the hash function of the unique identifier to authorize use of the medical device.

The invention claimed is:

1. A method of authenticating devices, the method comprising:

storing a unique identifier locally on each device, wherein a first unique identifier is stored locally on a first device;

modifying a central ledger located on a centralized system to include a first entry associated with the first unique identifier stored locally on the first device, wherein inclusion of the first unique identifier in the central ledger authorizes the first device for use;

communicating the central ledger to a plurality of local systems including at least a first local system, wherein each of the local systems stores the central ledger as a local ledger and the first local system stores the central ledger as a first local ledger;

receiving at the first local system the first unique identifier from the first device, and searching the first local ledger to verify/authenticate a validity of the first device for use in the first local system;

modifying the first entry in the first local ledger associated with the first unique identifier based on the use of the first device with the first local system, wherein modifying the first entry in the first local ledger associated with the first unique identifier includes deleting the first entry from the first local ledger, wherein deletion of the first entry from the first local ledger deauthorizes the first device for use;

communicating the first modified local ledger from the first local system to the centralized system;

modifying the central ledger based on the first modified local ledger received from the first local system, wherein the modifying the central ledger based on the first modified local ledger includes comparing the central ledger with the first modified local ledger and removing entries from the central ledger that do not appear in the first modified local ledger; and communicating the modified central ledger to each of the plurality of local systems, including the first local system.

2. The method of claim 1, wherein modifying a central ledger located on a centralized system to include the first entry associated with the first unique identifier stored locally on the first device further includes:

applying a cryptographic hash function to the first unique identifier to generate a first device hash number, wherein the first device hash number uniquely identifies the first device in the central ledger.

3. The method of claim 2, wherein receiving at the first local system the first unique identifier from the first device, and searching the first local ledger to verify/authenticate the validity of the first device for use in the first local system further includes:

applying the cryptographic hash function to the first unique identifier received from the first device to generate a first device hash number, wherein the first local ledger is searched using the first device hash number to verify/authenticate the validity of the first device.

4. The method of claim 1, further comprising:

creating a block based on the central ledger, wherein the block includes an index field, a hash field, a previous hash field, and the central ledger, wherein the index field stores a value identifying each block in a blockchain, the hash field stores a hash number generated by applying a hash function to the block, and the previous hash field stores a previous hash number corresponding with a previous block in the blockchain.

5. The method of claim 4, wherein in response to receiving a central ledger from the central system, the first local system compares the previous hash field to the hash field of a block previously received and stored by the first local system to verify that the received block is a child of the previously received block.

6. The method of claim 1, wherein modifying the first entry in the first local ledger associated with the first unique identifier based on the use of the first device with the first local system further includes:

applying a public encryption certificate to the first unique identifier to generate an encrypted first unique identifier, wherein the modifying the first entry in the first local ledger includes appending the encrypted first unique identifier to the first entry.

7. The method of claim 6, wherein modifying the central ledger based on the received first local ledger further includes:

applying a private key corresponding with the public encryption certificate to the encrypted first device identifier to validate physical possession of the first device by the first local system that communicated the modified first local ledger.

8. The method of claim 1, wherein communicating the modified first local ledger from the first local system to the centralized system includes signing the modified first local ledger using a non-migratable unique private key owned by the first local system so that the centralized system can verify an authenticity, integrity and non-repudiation of the modified first local ledger.

9. The method of claim 1, wherein communicating the modified central ledger to each of the plurality of local systems includes signing the modified central ledger by the central ledger system using a unique private key and transmitting a corresponding public certificate along with the signed central ledger to each of the plurality of local systems.

10. The method of claim 3, wherein appending to the first entry further comprises appending one or more generator settings used during the medical procedure, wherein generator settings include one or more of procedure time or power setting.

11. A method of authenticating devices, the method comprising:

storing a unique identifier locally on each device, wherein a first unique identifier is stored locally on a first device;

modifying a central ledger located on a centralized system to include a first entry associated with the first unique identifier stored locally on the first device, wherein inclusion of the first unique identifier in the central ledger authorizes the first device for use;

communicating the central ledger to a plurality of local systems including at least a first local system, wherein each of the local systems stores the central ledger as a local ledger and the first local system stores the central ledger as a first local ledger;

receiving at the first local system the first unique identifier from the first device, and searching the first local ledger to verify/authenticate a validity of the first device for use in the first local system;

modifying the first entry in the first local ledger associated with the first unique identifier based on the use of the first device with the first local system, wherein modifying the first entry in the first local ledger associated with the first unique identifier includes appending to the first entry information regarding use of the first device by the first local system in a medical procedure;

communicating the first modified local ledger from the first local system to the centralized system;

modifying the central ledger based on the first modified local ledger received from the first local system, wherein modification of the central ledger includes appending to the first entry information regarding use of the first device by the first local system in the medical procedure; and communicating the modified central ledger to each of the plurality of local systems, including the first local system.

12. The method of claim 11, wherein appending information to the first entry comprises appending at least one of: (i) a procedure date/time, (ii) a procedure duration, (iii) a procedure type identifier, (iv) a total number of uses, (v) a location of the use, or (vi) conditions of use.

13. The method of claim 11, wherein appending information to the first entry comprises appending a generator identifier that identifies the first local system with which the first device was used.

14. A method of authenticating devices, the method comprising:

storing a unique identifier locally on each device, wherein a first unique identifier is stored locally on a first device;

modifying a central ledger located on a centralized system to include a first entry associated with the first unique identifier stored locally on the first device, wherein inclusion of the first unique identifier in the central ledger authorizes the first device for use;

communicating the central ledger to a plurality of local systems including at least a first local system, wherein each of the local systems stores the central ledger as a local ledger and the first local system stores the central ledger as a first local ledger;

receiving at the first local system the first unique identifier from the first device, and searching the first local ledger to verify/authenticate a validity of the first device for use in the first local system;

modifying the first entry in the first local ledger associated with the first unique identifier based on the use of the first device with the first local system;

communicating the first modified local ledger from the first local system to the centralized system, wherein communicating the modified first local ledger from the first local system to the centralized system includes signing the modified first local ledger using a non-migratable unique private key owned by the first local system so that the centralized system can verify the authenticity, integrity and non-repudiation of the modified first local ledger;

modifying the central ledger based on the first modified local ledger received from the first local system, wherein modifying the central ledger based on the received first local ledger includes verifying authenticity and integrity of each local ledger received from each of the plurality of local systems using a public certificate accompanying each of the received local ledgers; and communicating the modified central ledger to each of the plurality of local systems, including the first local system.

* * * * *